(12) United States Patent
Lai et al.

(10) Patent No.: US 6,721,287 B1
(45) Date of Patent: Apr. 13, 2004

(54) FAR ECHO CANCELLER FOR PCM MODEMS

(75) Inventors: Yhean-Sen Lai, Warren, NJ (US); Kannan Rajamani, Tinton Falls, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/392,380

(22) Filed: Sep. 9, 1999

(51) Int. Cl.[7] .................................................. H04B 3/20

(52) U.S. Cl. ..................... 370/286; 370/523; 375/148

(58) Field of Search ................................ 370/286, 288, 370/289, 290, 523, 508, 519, 292, 457, 516, 517; 375/148, 346, 285, 316

(56) References Cited

U.S. PATENT DOCUMENTS

| | | | | |
|---|---|---|---|---|
| 5,995,558 A | * | 11/1999 | Betts et al. | 375/316 |
| 6,023,493 A | * | 2/2000 | Olafsson | 375/354 |
| 6,081,567 A | * | 6/2000 | Olafsson | 375/354 |
| 6,118,813 A | * | 9/2000 | Lai | 375/231 |
| 6,212,207 B1 | * | 4/2001 | Nicholas | 370/523 |
| 6,317,419 B1 | * | 11/2001 | Olafsson et al. | 370/292 |
| 6,404,809 B1 | * | 6/2002 | Zhang | 375/232 |

* cited by examiner

Primary Examiner—Douglas Olms
Assistant Examiner—Brian Nguyen
(74) Attorney, Agent, or Firm—Synnestvedt & Lechner LLP

(57) ABSTRACT

A pulse code modulation modem having a far echo canceller that compensates for robbed bit echo noise by polling the receiving modem for robbed bit position information and incorporating that information into its far echo cancellation circuitry.

23 Claims, 6 Drawing Sheets

FAR ECHO CANCELLER FOR PCM MODEMS

FIELD OF INVENTION

The invention pertains to modems. More particularly, the invention pertains to modems designed to operate in accordance with the CCITT V.90 and V.90PLUS standardized protocols.

BACKGROUND OF THE INVENTION

Modems are transceiver devices that allow digital data to be transmitted between pieces of digital equipment, e.g., computers, via the telephone lines. The transmitting modem receives serial digital data from a computer (typically passed from the computer to the modem through a UART (Universal Asynchronous Receiver Transmitter) in order to convert it from parallel to serial format. The modem converts the data to a signal form that can be transmitted effectively via the public telephone system. The receiving modem receives that data and converts it back to serial digital format and passes it to the receiving computer (typically through another UART, which converts the data back to parallel).

Over the past few decades, several protocol standards for modems have been developed. One of the more recent standards has been promulgated by the ITU (International Telecommunications Union) formerly known as the CCITT and is known as ITU-T recommendation V.90, incorporated herein by reference. Earlier generation standards developed by the ITU/CCITT include V.22, V.22bis, V.32, V.34, V.42 and V.42bis.

In the relevant industries, communication in the transmit direction from a network node, such as a telephone or a modem, in the direction of the telephone company central office is termed the upstream direction. Receive direction communications from the network towards a node is termed the downstream direction. In accordance with the V.90 protocol, the data format is different in the downstream direction than it is in the upstream direction. In the V.90 standard, modem transmission in the upstream direction is an analog signal in accordance with the older V.34 standard. However, downstream communication is a PCM (pulse code modulated) signal.

There also is a proposed V.90PLUS recommendation, also incorporated herein by reference, which presently is not in commercial use. In the V.90PLUS standard, PCM is used in both the upstream and downstream directions.

FIG. 1 is a block diagram generally illustrating modem to modem communications through a public telephone network. The system will be described in connection with a public telephone network customer exchanging data with his Internet service provider (ISP) through the public telephone network. For purposes of fully illustrating the various factors contributing to noise in this type of communication, let us assume the customer and his ISP are coupled to different central offices of the public telephone network.

The customer at computer 12 inputs and sends data to the ISP at 28. The computer 12 includes a built-in UART and, therefore, sends out a serial digital signal to the modem 14. The modem converts the serial digital signal to comply with the V.90 standard (which, in the upstream direction, is the analog V.34 standard) and puts it out on the public telephone network 20.

Under the V.34 standard, data rates as great as 31.2 kilobits per second (Kbps) can be achieved.

Within the telephone network, telephony communications between central offices are digital, rather than analog. Accordingly, the analog signal is encoded by a codec 22 into a 64 Kbps signal. In particular, the received analog signal is sampled at a rate of 8 KHz and digitized at an 8 bit resolution to produce a 64 kbps digital PCM signal. The 64 kbps standard is known in the United States as the $\mu$-law standard and in Europe as the A-law standard. The information is digitally transmitted between central office 24 and central office 26.

For voice and data communications between two normal customers of the public telephone network, the digital signals received at central office 26 from other central offices on the network, e.g., central office 24, would be passed through another codec (not shown) to be decoded back to analog form. The decoded analog signals would then be forwarded to the receiving customer. However, a high volume customer of the public telephone network, such as an ISP 28, would likely have a high bandwidth digital connection to the central office 26, such as a T-1 line 30. Accordingly, ISP 28 would not use a codec in central office 26, but instead would receive the data in digital form over a digital link, such as a T1 line 30.

In the opposite direction, ISP 28 outputs digital data to central office 26 via T1 line 30. This data is transmitted in digital form to central office 24. Codec 22 in central office 24 decodes the digital data to a PCM analog version of the digital signal in accordance with the V.90 protocol and transmits it to the customer. The customer's modem 14 receives the data and converts it to a serial digital data format detectable by computer 12. Finally, the UART in computer 12 converts the data from serial to parallel. In the downstream direction, data can be received at rates as great as 56 Kbps.

As can be seen, under the V.90 standard, upstream communications are at a different data rate, i.e., 31.2 Kbps, than downstream communications, i.e., 56 kbps. Further, the communications in the upstream direction, is in an analog format, i.e., V.34, and, in the downstream direction, are in PCM format.

FIG. 2 is a more detailed block diagram of the interface between a customer's modem 14 and the local central office 24. As shown, the modem 14 accepts transmit data from the computer's UART 201 on a transmit data path 202 and sends data to the computer's UART 201 on a receive data path 204. In the transmit (upstream) direction, V.90 transmitter 203 in modem module 206 of modem 14 converts data between the serial digital format generated by the UART 201 to the analog V.34 format. Codec 209 converts the data from digital to analog for transmission over the telephone lines. In the receive direction (i.e., downstream), V.90 receiver 205 in modem module 206 converts data from the V.90 PCM format to the serial digital format used by UART 201. Codec 209 converts data from analog to digital in the receive direction.

The customer's equipment (to the left of hybrid circuitry 208 in FIG. 2) is a four wire system. That is, there are two wires for the transmit direction (i.e., each of lines 202 and 204 comprises two wires) and two wires for the receive direction (i.e., each lines 204 and 207 comprises two wires). The public telephone network, however, is a two wire system in which the transmit data and the receive data are transmitted over the same wire pair. Accordingly, a hybrid circuit 208 interfaces between the codec 209 and the public telephone network 210. In the transmit direction, it takes the transmit data from the codec and places it on the two wires 211 (tip and ring) of the telephone network. In the receive direction, it selects and isolates the receive data from wires 211 and forwards it to the modem module 206 on the receive wire pair 207. There is almost always an impedance mismatch between the customer's telephone equipment and the public telephone network. This impedance mismatch has the unfortunate effect of causing an echo at the hybrid circuit. The echo occurs in both directions. For instance, data transmitted from the computer 12 through the modem module 206 to the hybrid 208 is reflected back on the receive wire pair 207 to the modem module 206 and computer 12. Likewise, data received from the public telephone network over the tip and ring wire pair 211 also is reflected back onto the public telephone network.

At the central office, there is another hybrid circuit 224 and codec circuit 226 serving essentially the same functions. Hybrid circuit 224 also creates echos in both directions. The echo from hybrid circuit 224 passes back through hybrid circuit 208 and reach the receive data path 204, 207. Such echoes are not particularly bothersome for voice communications, which can bear a significant amount of noise and still provide signal quality acceptable to the human ear. However, echo signals of large enough amplitude can corrupt digital data that is being received simultaneously with the echo on the receive data path 204, 207.

FIG. 3 is a block diagram illustrating a customer-to-customer link through a public telephone network between an individual using a PC with a V.90 modem and his ISP having an all digital connection to the network. FIG. 3 illustrates echo effects.

In this example, the two customers are geographically distant from each other so that they are coupled to different central offices. Accordingly, transmissions in the upstream direction pass from the first customer's transmission circuitry 302 over transmit data path 303 through his hybrid circuit 304 onto two wire portion 316 of the public telephone network and through the hybrid circuit 306 in central office 308 to re-separate the transmit and receive direction data for the four wire digital network portion 310. The data is converted to digital and then transmitted over the digital, inter-central-office network portion 310 to central office 312 where it is forwarded, still in digital form, to modem 314 of ISP 316.

Thus, the first customer's telephone equipment has a hybrid circuit 304 for converting from four wire to two wire. His local central office also has a hybrid circuit 306 for converting from two wire back to four wire for the digital network 310. In the upstream direction, the customer experiences a near echo 333a from hybrid circuit 304 and a near echo 333b from hybrid circuitry 306. Because the hybrid circuit 304 in the customer's own equipment as well as the hybrid circuit 306 in his local central office are physically close to him, the near echo is almost simultaneous with the actual transmission of the data. Accordingly, in most circumstances it can be ignored without significant adverse effect in voice communication. However, in data communication, a near echo canceller is required in client modem 301 to remove the near echo in order to achieve better performance.

The ISP's modem 314 experiences a far echo 333c from hybrid circuit 306 in far central office 308 and a far echo 333d from the customer's hybrid circuit 304. Receipt of the far echos at a modem such as modem 314 may be, and commonly are, sufficiently delayed from the original transmission of the data that created the echo to corrupt data on the receive data path of modem 314.

In order to minimize the effect of far echo, therefore, a digital loss of approximately 6 decibels (dB) is incorporated into hybrid circuits so as to reduce echo amplitude. However, even with the incorporation of digital loss, far echo sometimes can still create sufficient noise to corrupt data.

Thus, in order to further compensate for echo, digital communications equipment (e.g., modems) commonly include an echo canceller circuit. FIG. 4 is a block diagram of an echo canceller circuit of the prior art. The transmit signal from transmitter 400 on transmit path 401 is fed out to the digital network 402. The transmit signal also is fed into an echo cancellation circuit 403. The echo canceller circuit includes a bulk delay line buffer 404 and a Finite Impulse Response (FIR) circuit 406. FIR circuit 406 receives the transmit signal from transmit wire pair 401 through bulk delay line buffer 404 and generates an echo cancellation signal that can be used to cancel the far echo signal portion that returns from the network. The FIR circuit determines, at the beginning of each call, the channel response for the call (e.g., attenuation of echoes, etc.), emulates it and applies it to the data transmitted from transmitter 400 so that the echo cancellation signal emulates the echo signal. The bulk delay line buffer 404 is the circuit that determines and causes the necessary delay in order to cause the output from the FIR circuit 406 to be simultaneous with the receipt of the far echo.

As is well known in the art, significant handshaking takes place between the central office interface circuit and the customer's modem. From that handshaking, the round trip delay of the far echo as well as the channel response for any given telephone call can be readily determined. Accordingly, a processor 412 in the modem determines the round trip delay and the necessary coefficients for the FIR circuit 406 from the handshaking data and sends the data to the bulk delay line buffer 404 and the FIR circuit, respectively. The delay circuit 404 will then delay passing the transmit data from transmit path 401 to the FIR circuit 406 for the appropriate duration, namely, the round trip delay, and the FIR will attenuate and otherwise condition the transmit signal to emulate the echo signal. Subtractor 410 subtracts the output of FIR circuit 406 from the receive data path 408 in order to cancel the far echo component that appears on receive data path 408. It should be noted that the far central office and the receiving customer's equipment are typically geographically close to each other such that the difference in delay between the two can be ignored and the far echo treated as a single far echo signal.

Another noise factor inherent in telephony communications is "robbed bit" noise. In particular, in the digital network portion between telephone company central offices, the least significant bit (LSB) of every sixth data sample is utilized for synchronization. In the United States, for instance, there is one type of robbed bit loss, termed type A. In type A robbed bit systems, the LSB of every sixth data sample (each data sample comprises 8 bits) is forced to digital one regardless of the actual data content. There also are other types of robbed bit protocols. Further, if a connection is routed through a plurality of central offices between the two termination points of the connection, a robbed bit may be inserted for each central office through which a particular call is routed such that there may be several robbed bits every six samples. As will become clear from the discussion below, the present invention is applicable regardless of the particular robbed bit protocol utilized or the number of robbed bits inserted.

In voice communications, for which, of course, the telephone network was originally constructed, the loss of that bit is imperceptible to the listener and, therefore, unimportant. The echo effect of the robbed bit also is acceptable in connection with analog data transmissions such as in accordance with the V.34 modem standard. However, in PCM data communications over the telephone network, the robbed bit must be taken into consideration. Particularly, data cannot be sent in that bit position since it will be corrupted in the digital portion of the network.

Further, the far echo that comes back through the digital network includes the robbed bit. Accordingly, the echo cancellation signal generated by echo cancellation circuit 403 will not exactly match the echo signal portion. Specifically, the signal echoed back to the transmitting equipment contains the robbed bit, whereas the signal that was transmitted on transmit path 401, and, therefore, was used to create the echo cancellation signal did not contain the robbed bit.

However, the robbed bit is generated in the inter-central-office digital portion of the telephone network. Accordingly, the PCM output signal from the central office codec does not include the robbed bit, which is added later. Accordingly, the signal that is sent from the central PCM modem to the echo canceller circuit does not include the robbed bit information. Accordingly, the echo canceller cannot cancel the robbed bit which is received in the echo.

Accordingly, it is the object of the present invention to provide an improved far echo cancellation method and apparatus.

SUMMARY OF THE INVENTION

In accordance with the present invention, a PCM modem is provided with a far echo canceller circuit which includes a robbed bit generator to compensate for the robbed bit which will appear in the far echo signal received over a telephone network.

In particular, during the handshaking which occurs at the initiation of a telephone call, the transmitting PCM modem determines from the modem at the receiving end the position of the robbed bit added by the telephone network. Based on this information, the position of every robbed bit during the telephone call is known, since it occurs at regular intervals. The robbed bit position information is provided to a robbed bit generator circuit in the echo canceller of the PCM modem which then incorporates the robbed bit into the echo cancellation signal to compensate for the far echo signal, including the robbed bit.

DETAILED DESCRIPTION OF THE INVENTION

Figure 1:
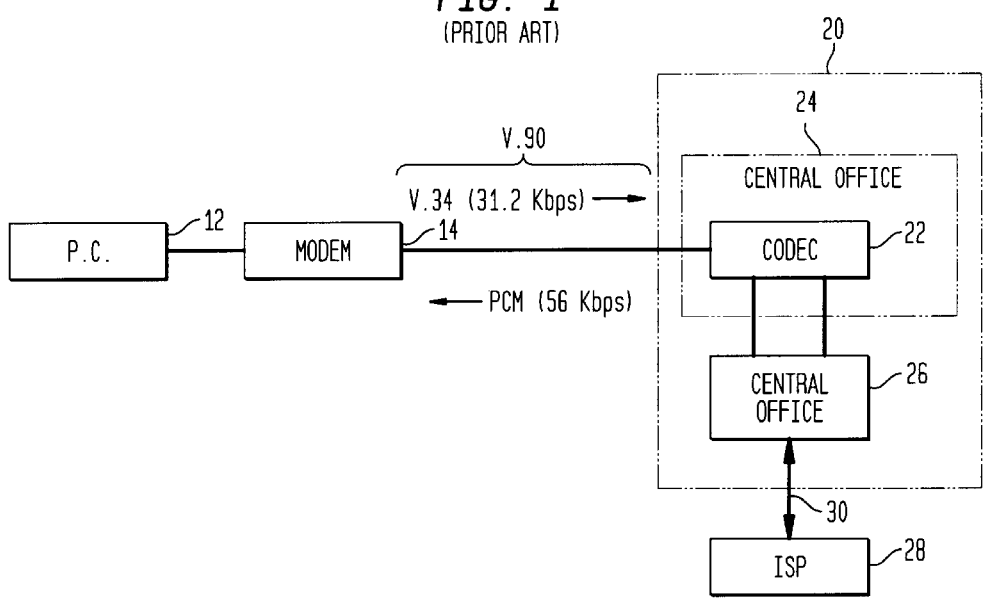
FIG. 1 is a block diagram generally illustrating modem to modem communications through a public telephone network in accordance with the prior art.
Figure 2:
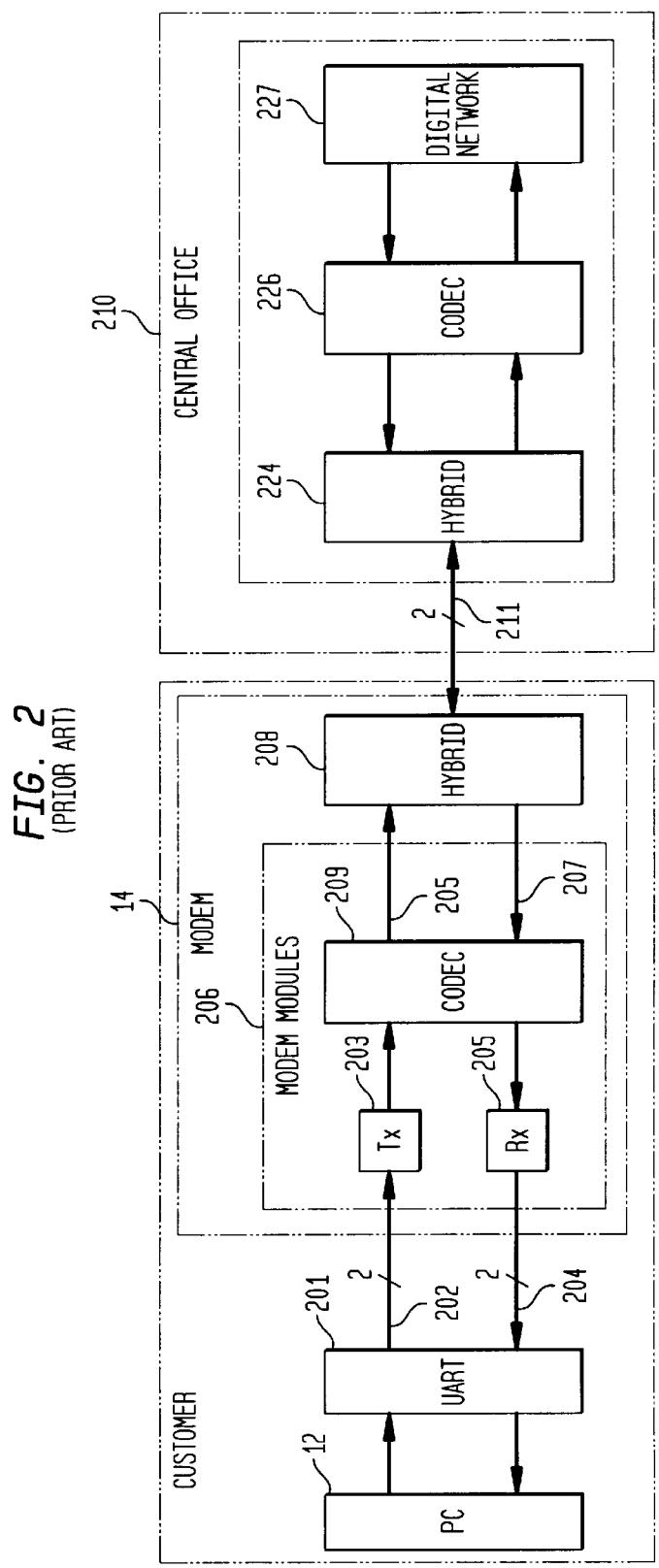
FIG. 2 is a more detailed block diagram of the interface between a customer's modem and the local central office in accordance with the prior art.
Figure 3:
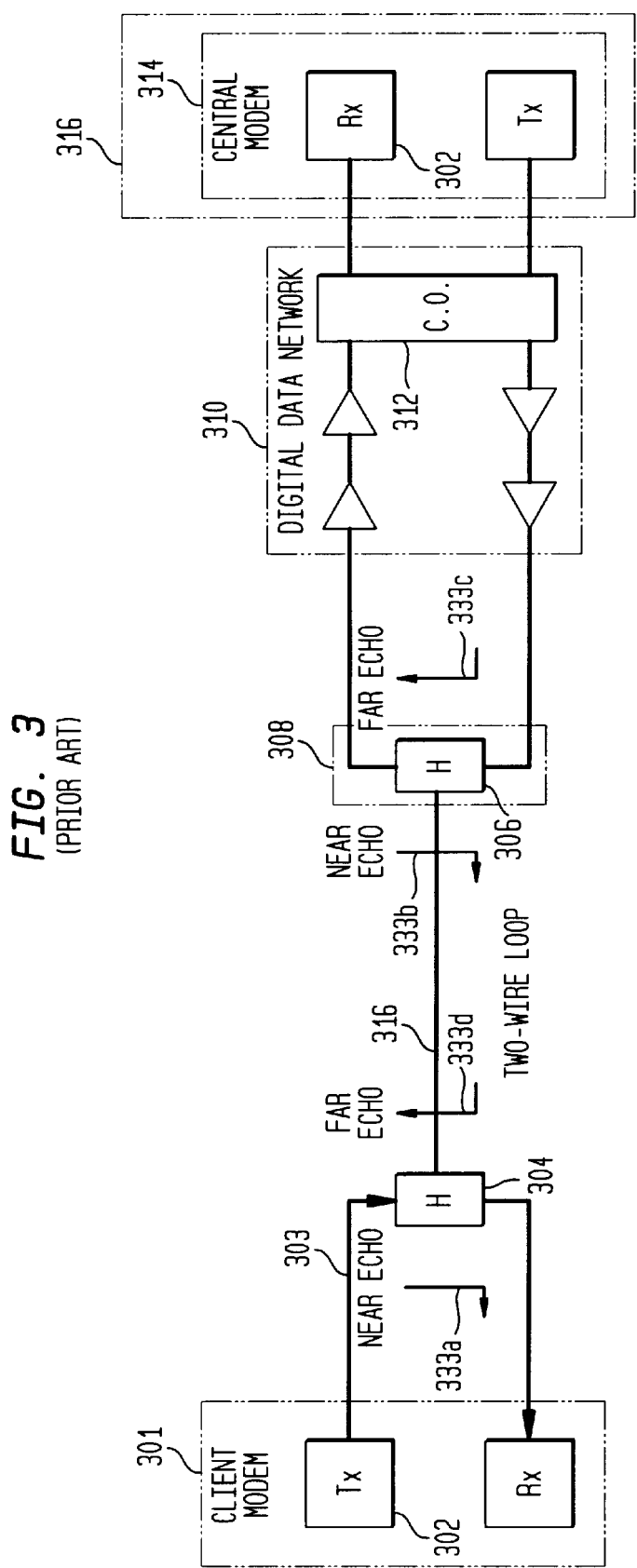
FIG. 3 is a block diagram illustrating echo in customer-to-customer communications through a public telephone network in accordance with the prior art.
Figure 4:
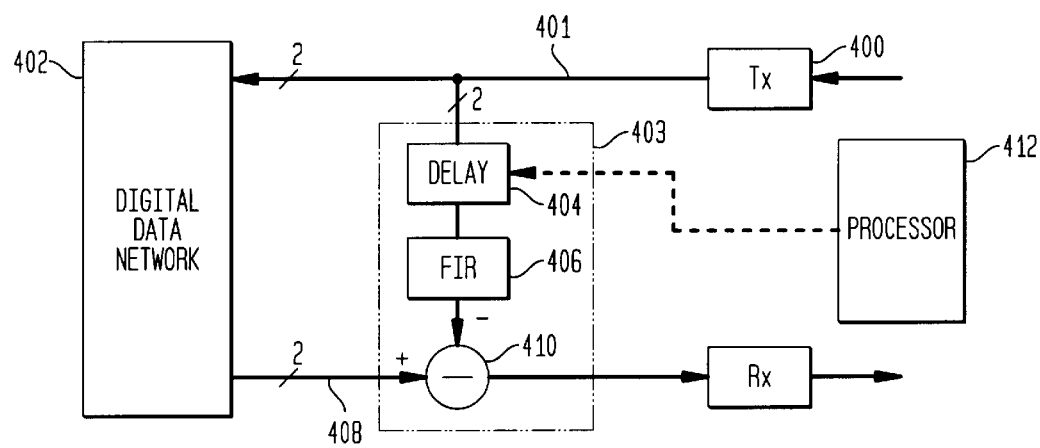
FIG. 4 is a block diagram of an echo cancellation circuit in accordance with the prior art.
Figure 5:
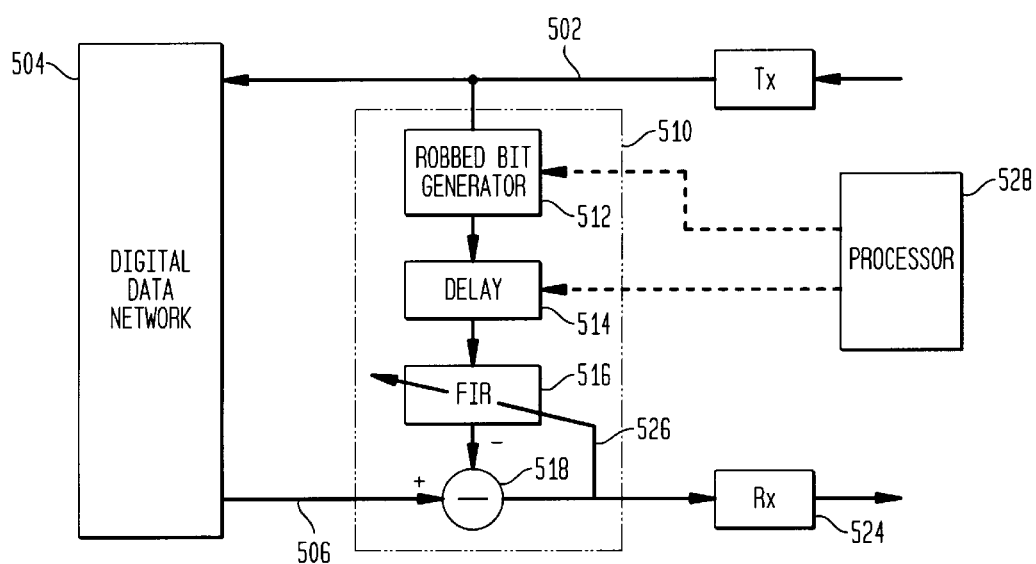
FIG. 5 is a block diagram of a far echo cancellation circuit in accordance with the present invention.

FIG. 5 is a block diagram of the front end of a V.90 standard central modem. As used herein, the term central modem refers to a modem that transmits in PCM format, such as might be found in the facilities of an ISP or other large-scale telephony customer that can hook directly to the digital portion of the telephone network. Thus, for example, referring to FIG. 1, the central modem would be the modem of ISP 28, which transmits in PCM.

As noted above, at least in the United States, almost all communications over the digital portion of the public telephone network (between central offices) utilizes robbed bit synchronization. Accordingly, the central modem transmits data on transmission wire pair 502 to the digital network 504. The digital network modifies the signal to insert the robbed bit once every six samples. Thus, when the far echo comes back from the hybrid circuit at the far central office on receive wire pair 506 and the hybrid circuit of the customer's modem, the echo typically is different due to the addition of the robbed bit to the original signal.

A robbed bit may be added in the downstream signal as well as in the echo of the upstream signal. In fact, if a call is routed through several central offices between termination points, several robbed bits may be inserted in each direction. The echoed upstream robbed bit(s) is of less significance because of the presence of the digital loss circuitry which attenuates the echo. Specifically, by the time an upstream robbed bit returns in an echo to the transmission source, it has gone through at least one digital loss circuit and is therefore of almost negligible amplitude. The down stream robbed bit does not experience the digital loss. Thus, the robbed bit(s) in the downstream data is the one that is of major concern to the performance of central PCM modems.

The front end of the central PCM modem includes a far echo canceller circuit 510. This far echo canceller comprises a robbed bit generator 512, a bulk delay line buffer 514, a FIR circuit 516 and a subtractor 518.

In order to incorporate robbed bit correction into the FIR circuit 516, the location of the robbed bit is determined by the central PCM modem. The information necessary to determine the position of the robbed bit is obtained from the customer's modem during the initial handshaking that occurs between the central PCM modem and the customer's modem at the commencement of a communication link. This is done independently of the present invention since the central PCM modem needs to determine the location of the robbed bit for synchronizing to the network in the first place.

Particularly, the central PCM modem sends a training signal to the customer's modem during initialization. In connection with the receipt of the training signal, the customer's modem detects the position of the robbed bit. The customer's modem then sends the information of the position of the robbed bit back to the central PCM modem. That information is used by the robbed bit generator circuit 512 to modify the signals it receives from the central PCM modem transmitter to add in the effect of the robbed bit. That modified signal is then sent to the bulk delay line buffer 514.

The robbed bit generator circuit may take on any number of forms. In essence, it performs the exact same function as the robbed bit generating circuitry of the communications network itself. Thus, there are numerous well known circuits for this purpose that can be utilized. Any of those circuit designs could be used for the present invention.

Figure 6:
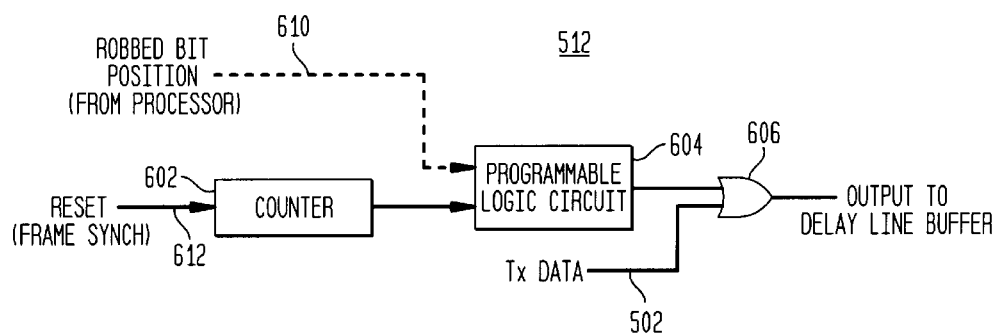
FIG. 6 is a circuit diagram of an exemplary embodiment of the robbed bit generator of FIG. 5.

However, FIG. 6 illustrates one very simple embodiment of robbed bit generator 512. It comprises a counter 602 set to circularly count to 48 (6×8), a programmable logic circuit 604 and an OR gate 606. After the processor has determined the position of the robbed bit, it places data indicating the position of the robbed bit relative to some reference point in the data transmission on line 610. In a TDM network, for instance, the reference point may be the start of a frame as indicated by receipt of the frame synchronization pulse and the position information is the number of bits from the frame start to the position of the first robbed bit in the frame. If we assume that we are concerned only with the downstream robbed bit and that only one downstream robbed bit is inserted, the robbed bit will be the LSB of one of the sample bytes and must occur every 6 samples as previously discussed, this number will be 8, 16, 24, 32, 40 or 48. The counter 602 is reset by the frame synchronization signal at the start of every frame and then counts to 48 circularly until reset again. The programmable logic circuitry 604 is designed to output a one in the bit position corresponding to the position provided to it on line 610 by the processor and a 0 in the other 47 positions. OR gate 606 is coupled to receive the output of the programmable logic circuit at one input and the transmit data from the transmit data path 502 at the other input. Accordingly, the bits transmit data stream corresponding to the positions of the robbed bits are converted to 1 by the robbed bit generator circuit while all other bits remain unaffected.

In alternate embodiments either or both of upstream and downstream robbed bits can be detected and canceled. Also, if the particular connection passes through several central offices such that more than one robbed bit is inserted in either or both directions, the invention would detect and compensate for all of the robbed bits.

During the initialization handshaking, the central PCM modem also determines the time delay of the far echo by measuring the round trip delay during a portion of the start up protocol in which the customer's modem is not transmitting any data. This allows the central PCM modem to receive back the far echo signal without any other data being placed on the line. This measurement is well known in the prior art and forms no part of the present invention. The bulk delay line buffer 514 then delays the output of the modified signal to the FIR circuit 516 for the determined amount of time (termed "round trip delay"). The FIR circuit 516 then applies the channel response to the signal and outputs an echo cancellation signal to subtractor 518 in order to overlap and cancel the far echo received from the digital data network 504 on receive line 506. The output on line 520, termed the residual signal, is then forwarded to the receiver 524 of the central PCM modem. As illustrated by feedback line 526, the FIR circuit includes feedback for continuously correcting the FIR circuit.

Accordingly, the central PCM modem can readily identify the echo and determine the round trip delay as well as the positions of the robbed bits. Once the position of one robbed bit is determined, then the position of all robbed bits is known since they occur at regular intervals. The central PCM modem digital signal processor 528 must also determine what type of robbed bit protocol is being used on the network. This information also is typically determined during training and is well known in the art. Alternately, the PCM modem may simply be pre-set to a particular type of robbed bit compensation since, frequently, it is known in advance what type of public telephone network the modem would be used in connection with and particularly what type of robbed bit protocol is used on that network.

In the PCM V.90PLUS protocol, during initialization handshaking, the position of the downstream robbed bit is detected by the client modem and that position information is given to the central modem. The position of the robbed bit in the upstream direction can be determined by the central modem itself in the V.90PLUS protocol.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A transceiver apparatus for carrying out communications with another transceiver over a communications network on which transmit and receive data for said transceiver apparatus are communicated over the same path over at least a portion of said network, said apparatus comprising:

a transmitter;

a receiver;

an echo cancellation circuit coupled to said receiver for detecting data transmitted over said network from said transmitter and generating an echo cancellation signal, said echo cancellation signal designed to cancel an echo of said transmitted data received over said network, said cancellation signal including compensation for a robbed bit generated by said network appearing in said echo; and a processor, said processor programmed to receive data indicating the position of said robbed bit generated by said network from said another transceiver and coupled to provide said position data to said echo cancellation circuit;

wherein said processor receives said data indicating the position of said robbed bit from said another transceiver in response to a training signal sent by said transceiver to said another transceiver.

2. The transceiver apparatus as set forth in claim 1 further comprises a subtractor coupled between said echo cancellation circuit and said receiver for subtracting said cancellation signal from data received at said receiver from said network.

3. The transceiver apparatus as set forth in claim 2 wherein said transmitter and receiver transmit and receive, respectively, using pulse code modulation.

4. The transceiver apparatus as set forth in claim 1 wherein said apparatus is a modem.

5. A transceiver apparatus for carrying out communications with another transceiver over a communications network on which transmit and receive data for said transceiver apparatus are communicated over the same path over at least a portion of said network, said apparatus comprising:

a transmitter;

a receiver;

an echo cancellation circuit coupled to said receiver for detecting data transmitted over said network from said transceiver and generating an echo cancellation signal, said echo cancellation signal designed to cancel an echo of said transmitted data received over said network, said cancellation signal adapted to compensate for a robbed bit generated by said network, said echo cancellation circuit comprising;

a robbed bit generator circuit coupled to receive data indicative of the position of said robbed bit generated by said network and incorporate said robbed bit into said echo cancellation signal;

a delay circuit coupled to receive data indicative of a round trip delay period for data transmitted to said other transceiver and delay said echo cancellation signal by said round trip delay period;

a channel response emulation circuit coupled to receive data indicative of a channel response and to condition said echo cancellation signal with said channel response; and a processor, said processor programmed to receive from said other transceiver data indicating the position of said robbed bit generated by said network and coupled to provide said position data to said echo cancellation circuit;

wherein said processor receives said data indicating the position of said robbed bit from said another transceiver in response to a training signal sent by said transceiver to said another transceiver.

6. The transceiver apparatus as set forth in claim 5, said processor further programmed to determine said round trip delay period for data transmitted to said another transceiver over said network and said channel response, said processor coupled to said delay circuit to provide said round trip delay period to said delay circuit and further coupled to said channel response emulation circuit to provide said channel response data to said channel response emulation circuit.

7. The transceiver apparatus as set forth in claim 6 further comprises a subtractor coupled between said echo cancellation circuit and said receiver for subtracting said cancellation signal from data received at said receiver from said network.

8. The transceiver apparatus as set forth in claim 7 wherein said channel response emulation circuit comprises a finite impulse response circuit.

9. The transceiver apparatus as set forth in claim 8 wherein said processor determines the position of said robbed bit and said round trip delay and coefficients for said finite impulse response circuit during initialization handshaking between said transceiver and said another transceiver apparatus.

10. The transceiver apparatus as set forth in claim 9 wherein said transmitter and receiver transmit and receive, respectively, using pulse code modulation.

11. The transceiver apparatus as set forth in claim 7 wherein said robbed bit generator circuit is coupled between said transmitter and said delay circuit, said delay circuit is coupled between said robbed bit generator circuit and said channel response emulation circuit, and said channel response emulation circuit is coupled between said delay circuit and said subtractor.

12. The transceiver apparatus as set forth in claim 5 wherein said apparatus is a modem.

13. An apparatus for canceling echo received over a communications network on which transmit and receive data between a first transceiver and a second transceiver are communicated over the same path over at least a portion of said network, said apparatus generating an echo cancellation signal at said first transceiver, said apparatus comprising:

a processor, said processor programmed to send to said second transceiver a training signal in response to which said second transceiver returns to said first transceiver data indicative of the position of said robbed bit, said processor further programmed to receive from said second transceiver said data indicative of the position of said robbed bit generated by said network;

a robbed bit generator circuit coupled to receive from said processor said data indicative of the position of said robbed bit generated by said network and incorporating said robbed bit into said echo cancellation signal;

a delay circuit coupled to receive data indicative of a round trip delay period for data transmitted to a destination and delaying said echo cancellation signal by said round trip delay period; and a channel response emulation circuit coupled to receive data indicative of a channel response and to condition said echo cancellation signal with said channel response.

14. The apparatus as set forth in claim 13 said processor further programmed to determine said round trip delay period for data transmitted to said second transceiver over said network and said channel response, said processor coupled to said delay circuit to provide said round trip delay period to said delay circuit and further coupled to said channel response emulation circuit to provide said channel response data to said channel response emulation circuit.

15. The apparatus as set forth in claim 14 wherein said processor determines the position of said robbed bit, said round trip delay and said channel response during initialization handshaking between said transceiver and said destination.

16. The apparatus as set forth in claim 15 wherein said apparatus further comprises a subtractor for coupling between said apparatus and a receive path for receiving data over said network, said subtractor for subtracting said echo cancellation signal from data received over said network.

17. The apparatus as set forth in claim 16 wherein said channel response emulation circuit comprises a finite impulse response circuit.

18. A method of canceling echo received at a first transceiver coupled to a communications network on which transmit and receive data between said first transceiver and a second transceiver are communicated over the same path for at least a portion said network, said first transceiver comprising a transmit data path and a receive data path, said method comprising the steps of:

sending a training signal from said first transceiver to said second transceiver in response to which said second transceiver is to return to said first transceiver data indicating the position of a robbed bit generated by said network;

determining a round trip delay period for data transmitted from said first transceiver to said second transceiver;

receiving from said second transceiver said data indicating said position of said robbed bit generated by said communications network;

generating a cancellation signal at said first transceiver as a function of a signal transmitted from said first transceiver on said transmission path and said position of said robbed bit, said cancellation signal for canceling an echo of said transmitted data, including said robbed bit, received on said receive data path; and placing said cancellation signal on said receive data path said round trip delay period later than when said data was transmitted.

19. The method as set forth in claim 18 wherein said sending step, said receiving step and said determining step are performed during initialization handshaking between said first transceiver and said second transceiver.

20. A communications network on which transmit and receive data for transceivers coupled to said network are communicated over the same path over at least a portion of the network, said network comprising:

at least first and second nodes;

said first node having;

a first transmitter;

a first receiver; and a hybrid circuit for coupling data between a first portion of the network having separate data paths for transmit data and receive data and a second portion of the network having a shared data path for transmit and receive data;

said second node having;

a second transmitter;

a second receiver;

a processor, said processor programmed to receive from said first node data indicative of the position of a robbed bit generated by said network, wherein said processor receives said data indicative of the position of said robbed bit from said first node in response to a training signal sent by said second node to said first node; and an echo cancellation circuit for generating an echo cancellation signal, said echo cancellation circuit coupled between said second transmitter and said second receiver and comprising a robbed bit generator circuit coupled to receive from said processor said data Indicative of the position of said robbed bit generated by said network and incorporating said robbed bit into said echo cancellation signal, a delay circuit coupled to receive data indicative of a roundtrip delay period for data transmitted to a destination and delaying said echo cancellation signal by said round trip delay period, and a channel response emulation circuit coupled to receive data indicative of a channel response and to condition said echo cancellation signal with said channel response.

21. The communications network as set forth in claim 20 wherein said processor is further programmed to determine said round trip delay and said channel response, said processor coupled to said delay circuit to provide said round trip delay period to said delay circuit and further coupled to said channel response emulation circuit to provide said channel response data to said channel response emulation circuit.

22. The communications network as set forth in claim 21 wherein said second node further comprises a subtractor coupled between said echo cancellation circuit and said second receiver for adding said cancellation signal to data received at said second receiver from said network.

23. The network as set forth in claim 22 wherein said channel response emulation circuit comprises a finite impulse response circuit and wherein said processor determines the position of said robbed bit and said round trip delay and coefficients for said finite impulse response circuit during initialization handshaking between said transceivers.

* * * * *